US009319147B2

(12) United States Patent
Xie et al.

(10) Patent No.: US 9,319,147 B2
(45) Date of Patent: Apr. 19, 2016

(54) OPTICAL RECEIVER FOR QUADRATURE-PHASE-SHIFT-KEYING AND QUADRATURE-DUOBINARY SIGNALS

(71) Applicant: Alcatel-Lucent USA Inc., Murray Hill, NJ (US)

(72) Inventors: Chongjin Xie, Morganville, NJ (US); Sai Chen, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/319,866

(22) Filed: Jun. 30, 2014

(65) Prior Publication Data

US 2015/0381286 A1    Dec. 31, 2015

(51) Int. Cl.
*H04J 14/06* (2006.01)
*H04B 10/00* (2013.01)
*H04B 10/61* (2013.01)

(52) U.S. Cl.
CPC ................................ *H04B 10/6162* (2013.01)

(58) Field of Classification Search
USPC ............ 398/65, 152, 155, 159, 161, 205, 208
See application file for complete search history.

(56) References Cited

U.S. PATENT DOCUMENTS

| 7,266,310 | B1 | 9/2007 | Savory et al. |
| 7,366,362 | B2 | 4/2008 | Tanimura |
| 7,636,525 | B1 | 12/2009 | Bontu et al. |
| 7,747,177 | B2 | 6/2010 | Chen et al. |
| 8,260,154 | B2 | 9/2012 | Chang et al. |
| 2002/0133644 | A1* | 9/2002 | Fang .................... H04L 27/3433 710/2 |
| 2003/0223758 | A1* | 12/2003 | Giles .................. H04B 10/2569 398/147 |

(Continued)

FOREIGN PATENT DOCUMENTS

WO    WO2014026040 A1    2/2014
WO    WO 2014031423 A1 *  2/2014   ......... H04B 10/5167

OTHER PUBLICATIONS

Yan, M., et al., "Digital Clock Recovery Algorithm for Nyquist Signal," OFC/NFOEC Technical Digest, 2013, 3 pages.

(Continued)

*Primary Examiner* — David Payne
*Assistant Examiner* — Pranesh Barua
(74) *Attorney, Agent, or Firm* — Mendelsohn Dunleavy, P.C.; Yuri Gruzdkov

(57) ABSTRACT

We disclose an optical receiver that can receive PDM-QDB and PDM-QPSK signals without hardware changes. In an example embodiment, the optical receiver includes a MIMO equalizer configured to perform electronic polarization de-multiplexing and ISI compensation. The constant modulus algorithm that controls the configuration of the MIMO equalizer also causes the MIMO equalizer to output signal samples corresponding to the QPSK modulation format regardless of whether the received optical signal is QDB-modulated or QPSK-modulated. A QPSK-to-QDB constellation converter processes the signal samples generated by the MIMO equalizer to convert them into the QDB modulation format. A QDB decoder coupled to the constellation converter then recovers the data encoded in the received optical signal by mapping the processed signal samples onto the QDB constellation. Differential encoding used at the corresponding remote transmitter enables the decoder to correctly recover the encoded data both when the received optical signal is QDB-modulated and QPSK-modulated.

19 Claims, 5 Drawing Sheets

(56) References Cited

U.S. PATENT DOCUMENTS

| | | |
|---|---|---|
| 2005/0286908 A1 | 12/2005 | Way |
| 2008/0152361 A1 | 6/2008 | Chen et al. |
| 2010/0105616 A1 | 4/2010 | Jo et al. |
| 2010/0158521 A1 | 6/2010 | Doerr et al. |
| 2011/0038631 A1 | 2/2011 | Doerr |
| 2011/0142449 A1* | 6/2011 | Xie .................. H04B 10/60 398/65 |
| 2011/0182590 A1 | 7/2011 | Secondini et al. |
| 2011/0200339 A1* | 8/2011 | Komaki ............. H04B 10/61 398/208 |
| 2011/0255879 A1* | 10/2011 | Xie ................ H04B 10/2513 398/208 |
| 2012/0002979 A1* | 1/2012 | Xie .................. H04B 10/611 398/208 |
| 2012/0057863 A1 | 3/2012 | Winzer et al. |
| 2012/0084619 A1* | 4/2012 | Kuschnerov .......... H04J 14/06 714/752 |
| 2012/0263468 A1* | 10/2012 | Yaman ............. H04B 10/5561 398/65 |
| 2013/0230312 A1 | 9/2013 | Randel et al. |
| 2014/0079394 A1* | 3/2014 | Xie ................ H04B 10/5053 398/65 |
| 2014/0086594 A1* | 3/2014 | Xie ................ H04B 10/6161 398/208 |
| 2014/0105616 A1* | 4/2014 | Yan .................. H04L 7/0075 398/208 |
| 2014/0226971 A1* | 8/2014 | Vassilieva ......... H04B 10/6163 398/25 |
| 2014/0369685 A1* | 12/2014 | Calabro ............. H04B 10/614 398/65 |
| 2015/0222368 A1* | 8/2015 | Yu .................. H04B 10/5167 398/211 |

OTHER PUBLICATIONS

Ibrahim, S. K., et al., "Performance of 20Gb/s Quaternary Intensity Modulation Based on Binary or Duobinary Modulation in Two Quadratures with Unequal Amplitdues," IEEE Journal of Selected Topics in Quantum Electronics, vol. 12, No. 4, 2006, pp. 596-602.

Machi, F., et al., "111-Gb/s PolMux-Quadrature Duobinary for Robust and Bandwidth Efficient Transmission," IEEE Photonics Technology Letters, vol. 22, No. 11, 2010, pp. 751-753.

Li, J., et al., "Spectrally Efficient Quadrature Duobinary Coherent Systems with Symbol-Rate digital Signal Processing," Journal of Lightwave Technology, vol. 29, No. 8, 2011, pp. 1098-1104.

Cai, J. X., et al., "20 Tbit/s Transmission Over 6860 km With Sub-Nyquist Channel Spacing," Journal of Lightwave Technology, vol. 30, No. 4, 2012, pp. 651-657.

Zhang, J., et al., "Multi-Modulus Blind Equalizations for Coherent Quadrature Duobinary Spectrum Shaped PM-QPSK Digital Signal Processing," Journal of Lightwave Technology, vol. 31, No. 7, 2013, pp. 1073-1078.

\* cited by examiner

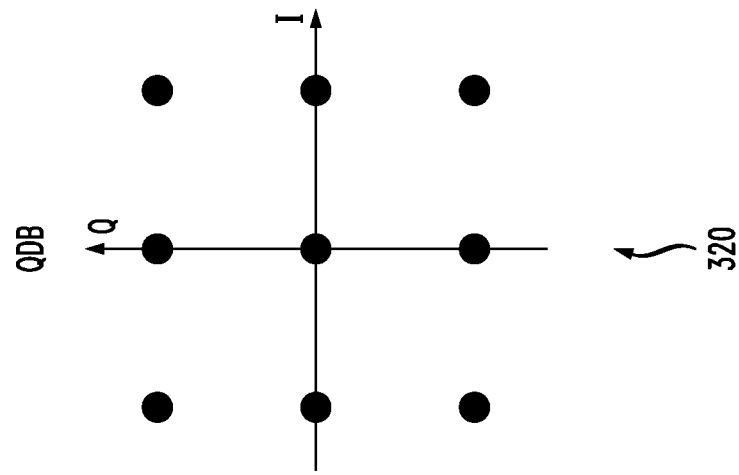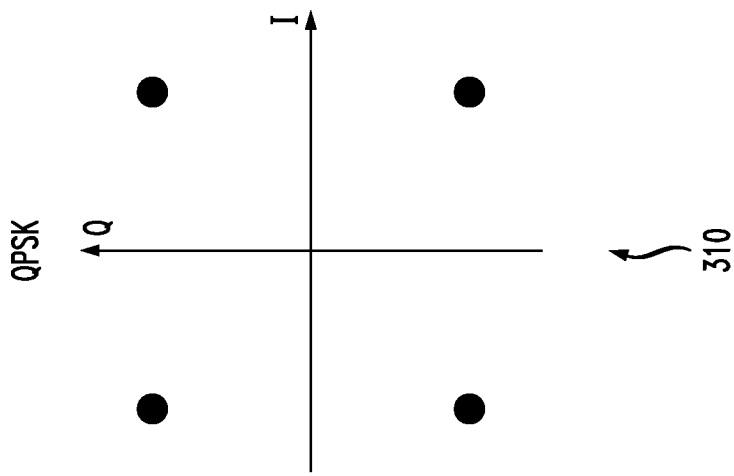
FIG. 3

500

600

US 9,319,147 B2

OPTICAL RECEIVER FOR QUADRATURE-PHASE-SHIFT-KEYING AND QUADRATURE-DUOBINARY SIGNALS

BACKGROUND

1. Field

The present disclosure relates to optical communication equipment and, more specifically but not exclusively, to an optical receiver for quadrature-phase-shift-keying (QPSK) and quadrature-duobinary (QDB) signals.

2. Description of the Related Art

This section introduces aspects that may help facilitate a better understanding of the disclosure. Accordingly, the statements of this section are to be read in this light and are not to be understood as admissions about what is in the prior art or what is not in the prior art.

Polarization-division-multiplexed (PDM) QPSK modulation with digital coherent detection is one of the leading technologies for use in 100-Gb/s optical transport systems. Recently, PDM-QDB modulation has attracted attention, as an alternative to PDM-QPSK modulation, due to its nearly doubled spectral efficiency and better tolerance to channel crosstalk, narrow optical filtering, and chromatic dispersion. However, currently available PDM-QDB receivers are not interchangeable with PDM-QPSK receivers and generally require more complicated digital signal processing.

SUMMARY OF SOME SPECIFIC EMBODIMENTS

Disclosed herein are various embodiments of an optical receiver that can receive PDM-QDB and PDM-QPSK signals without hardware changes. In an example embodiment, the optical receiver includes a MIMO equalizer configured to perform electronic polarization de-multiplexing and inter-symbol-interference compensation. The constant modulus algorithm that controls the configuration of the MIMO equalizer also causes the MIMO equalizer to output signal samples corresponding to the QPSK modulation format regardless of whether the received optical signal is QDB-modulated or QPSK-modulated. A QPSK-to-QDB constellation converter processes the signal samples generated by the MIMO equalizer to convert them into the QDB modulation format. A QDB decoder coupled to the constellation converter then recovers the data encoded in the received optical signal by mapping the processed signal samples onto the QDB constellation. Differential encoding used at the corresponding remote transmitter enables the decoder to correctly recover the encoded data both when the received optical signal is QDB-modulated and when the received optical signal is QPSK-modulated.

According to one embodiment, provided is an apparatus comprising: a front-end circuit configured to mix an optical input signal and an optical reference signal to generate a first plurality of electrical digital measures of the optical input signal; and a digital processor configured to: process the first plurality of electrical digital measures to recover data encoded in the optical input signal; and use inter-conversion between a QPSK constellation and a QDB constellation to enable recovery of the data both when the optical input signal is QPSK-modulated and when the optical input signal is QDB-modulated.

According to another embodiment, provided is an optical communications method comprising the steps of: (A) optically mixing an optical input signal and an optical reference signal to generate a first plurality of electrical digital measures of the optical input signal; (B) processing the first plurality of electrical digital measures to recover data encoded in the optical input signal; and (C) using inter-conversion between a QPSK constellation and a QDB constellation to enable recovery of the data both when the optical input signal is QPSK-modulated and when the optical input signal is QDB-modulated.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 graphically shows the relationship between QPSK and QDB constellations, which illustrates a principle of operation of the digital circuit of FIG. 2 according to an embodiment of the disclosure;

DETAILED DESCRIPTION

Figure 1:
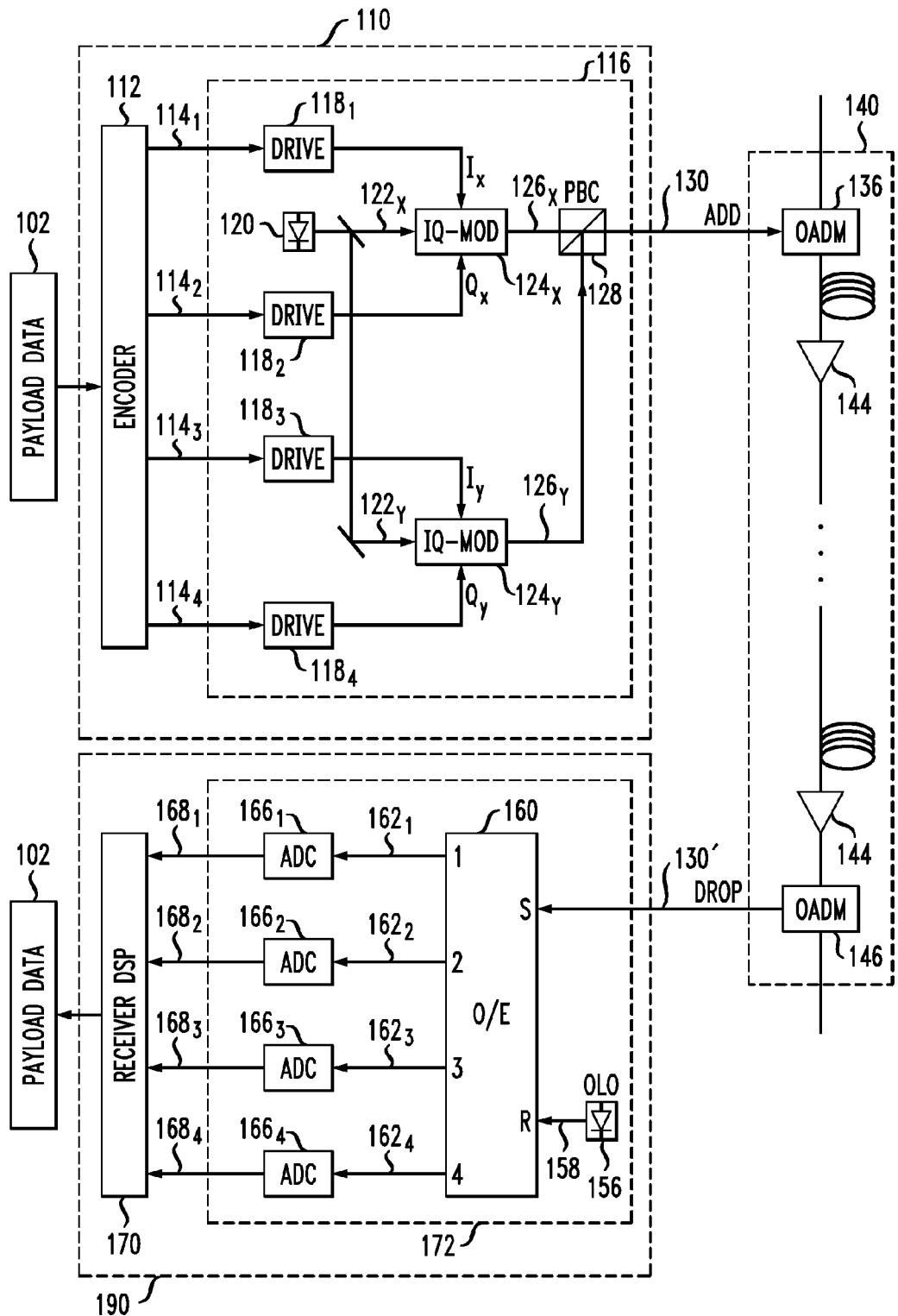
FIG. 1 shows a block diagram of an optical transport system according to an embodiment of the disclosure.

FIG. 1 shows a block diagram of an optical transport system 100 according to an embodiment of the disclosure. System 100 has an optical transmitter 110 and an optical receiver 190 coupled to one another via an optical transport link 140. Optical transmitter 110 can be either a PDM-QPSK transmitter or a PDM-QDB transmitter. Optical receiver 190 is compatible with both of these modulation formats and, as such, is capable of recovering the transmitted payload data, without any changes in the receiver's hardware structure, from both a PDM-QPSK signal and a PDM-QDB signal received from optical transport link 140.

In operation, transmitter 110 receives a digital (electrical) input stream 102 of payload data and applies it to an encoder 112. Encoder 112 processes input stream 102 to generate digital signals $114_1$-$114_4$. In an example embodiment, encoder 112 may perform one or more of the following: (i) de-multiplex input stream 102 into two sub-streams, each intended for optical transmission using a respective one of the two orthogonal (e.g., X and Y) polarizations; (ii) pre-code each of the sub-streams, e.g., to prevent error propagation at the receiver; and (iii) apply QPSK or QDB differential coding to each of the pre-coded sub-streams, e.g., to mitigate the deleterious effects of cycle slips at the receiver. As known in the art, differential coding operates to map data onto transitions between constellation points, rather than on constellation points themselves. In some embodiments, encoder 112 may also be configured to perform forward-error-correction (FEC) encoding, which adds redundancy to the transmitted data. In each signaling interval (also referred to as symbol period), signals $114_1$ and $114_2$ carry digital values that represent the in-phase (I) component and quadrature (Q) component, respectively, of a corresponding constellation point intended for transmission using a first (e.g., X) polarization of light. Signals $114_3$ and $114_4$ similarly carry digital values that represent the I and Q components, respectively, of the corresponding constellation point intended for transmission using a second (e.g., Y) polarization of light.

An electrical-to-optical (E/O) converter (also sometimes referred to as a front-end circuit) 116 of transmitter 110 transforms digital signals $114_1$-$114_4$ into a modulated optical output signal 130. More specifically, drive circuits $118_1$ and $118_2$ transform digital signals $114_1$ and $114_2$, as known in the art, into drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source 120 as indicated in FIG. 1, thereby generating a modulated optical signal $126_X$.

Drive circuits $118_3$ and $118_4$ similarly transform digital signals $114_3$ and $114_4$ into drive signals $I_Y$ and $Q_Y$, respectively. Based on drive signals $I_Y$ and $Q_Y$, an I-Q modulator $124_Y$ modulates a Y-polarized beam $122_Y$ of light supplied by laser source 120 as indicated in FIG. 1, thereby generating a modulated optical signal $126_Y$. A polarization beam combiner 128 operates to combine modulated optical signals $126_X$ and $126_Y$, thereby generating optical output signal 130. Optical output signal 130 is then applied to an optical add-drop multiplexer (OADM) 136 configured to add this signal, as known in the art, to other optical signals that are being transported via optical transport link 140.

In some embodiments, optical transmitter 110 may benefit from the use of circuits and/or signal-processing methods disclosed in U.S. Pat. No. 7,366,362, U.S. Patent Application Publication Nos. 2005/0286908, 2011/0182590, and 2012/0263468, and International Patent Application Publication No. WO 2014/026040, all of which are incorporated herein by reference in their entirety.

Optical transport link 140 is illustratively shown as being an amplified optical link having a plurality of optical amplifiers 144 configured to amplify the optical signals that are being transported through the link, e.g., to counteract signal attenuation. Note that an optical link that has only one or even no optical amplifiers can alternatively be used as well. After propagating the intended length of link 140, optical signal 130 becomes optical signal 130', which is dropped from the link by another optical add-drop multiplexer, OADM 146, and directed to receiver 190 for processing. Optical signal 130' may differ from optical signal 130 because link 140 typically adds noise and imposes various signal distortions, e.g., due to chromatic dispersion, polarization rotation, and polarization-mode dispersion therein.

Receiver 190 has a front-end circuit 172 comprising an optical-to-electrical (O/E) converter 160, four analog-to-digital converters (ADCs) $166_1$-$166_4$, and an optical local oscillator (OLO) source 156. O/E converter 160 has (i) two input ports labeled S and R and (ii) four output ports labeled 1 through 4. Input port S receives optical signal 130' from OADM 146. Input port R receives an optical reference signal 158 generated by OLO source 156. Reference signal 158 has an optical-carrier frequency (wavelength) that is sufficiently close to that of signal 130' to enable coherent (e.g., intradyne or homodyne) detection of the latter signal. Reference signal 158 can be generated, e.g., using a relatively stable tunable laser whose output wavelength is approximately the same as the carrier wavelength of optical signal 130'.

In one embodiment, O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature signal, respectively, corresponding to a first (e.g., x) polarization component of signal 130'. Electrical signals $162_3$ and $162_4$ may similarly be an analog in-phase signal and an analog quadrature signal, respectively, corresponding to a second (e.g., y) polarization component of signal 130'. Note that the orientation of the x and y polarization axes at receiver 190 may not coincide with the orientation of the X and Y polarization axes at transmitter 110.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, all of which are incorporated herein by reference in their entirety.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a digital signal processor (DSP) 170, e.g., as further described below in reference to FIGS. 2-6, to recover the data of the original data stream 102 applied to transmitter 110.

Figure 2:
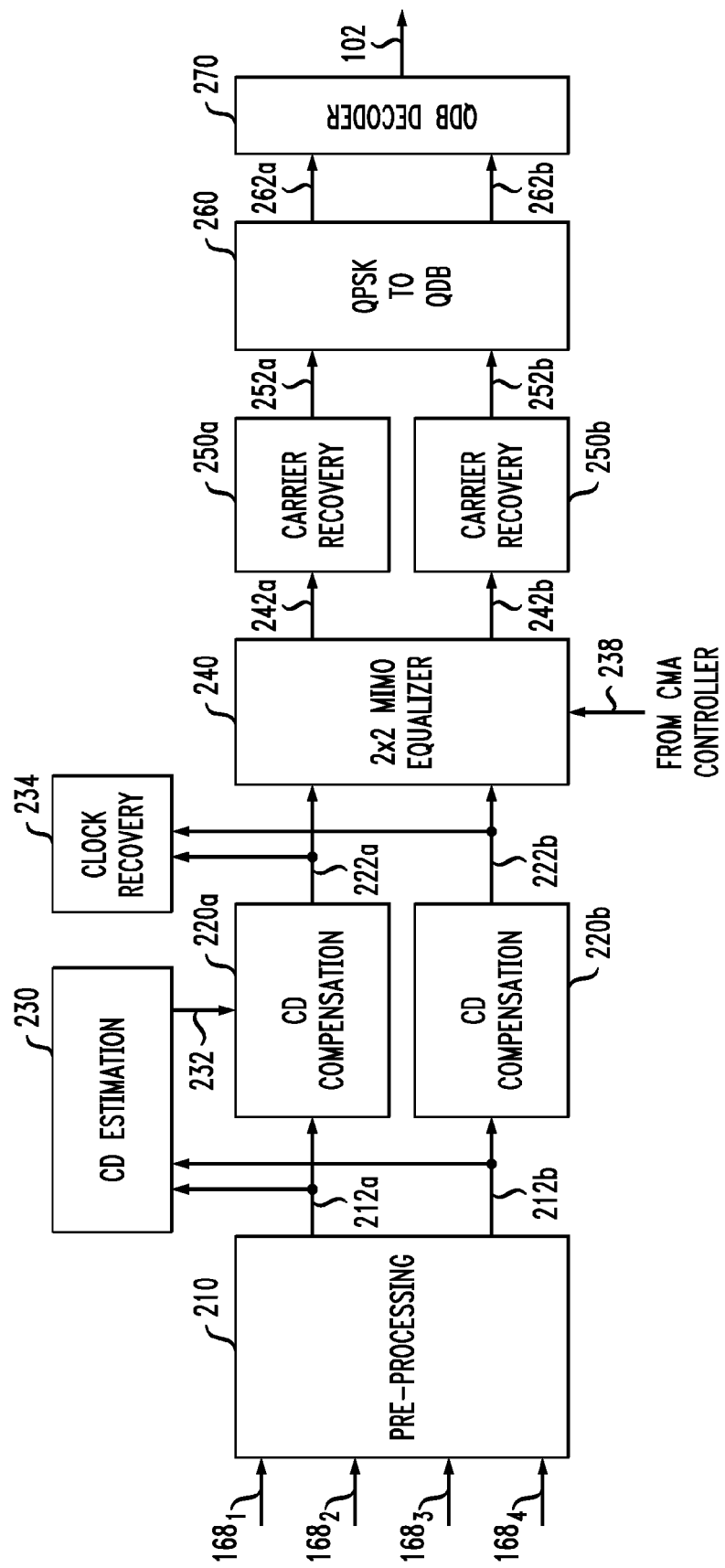
FIG. 2 shows a block diagram of an electrical digital circuit that can be used in the optical transport system of FIG. 1 according to an embodiment of the disclosure.

FIG. 2 shows a block diagram of an electrical digital circuit 200 that can be used in DSP 170 (FIG. 1) according to an embodiment of the disclosure. Digital circuit 200 is illustratively shown in FIG. 2 as being configured to (i) receive digital signals $168_1$-$168_4$ and (ii) generate the recovered data stream 102 (also see FIG. 1). In alternative embodiments, additional signal-processing modules may be used, e.g., to condition digital signals $168_1$-$168_4$ prior to their application to digital circuit 200.

Ideally, digital signals $168_1$-$168_2$ represent the I and Q components, respectively, of the X polarization component of optical signal 130, and digital signals $168_3$-$168_4$ represent the I and Q components, respectively, of the Y polarization component of that optical signal. However, optical-link impairments, receiver-implementation imperfections, and configuration inaccuracies generally cause each of digital signals $168_1$-$168_4$ to be a convoluted signal that has various signal distortions and/or contributions from both of the original polarization components (such as signals $126_X$ and $126_Y$). The train of signal processing implemented in digital circuit 200 is generally directed at reducing the adverse effects of various signal distortions and de-convolving digital signals $168_1$-$168_4$ so that the encoded data can be properly recovered to generate output data stream 102. Also note that the train of signal processing implemented in digital circuit 200 works both when optical signal 130 is a PDM-QPSK signal and when optical signal 130 is a PDM-QDB signal.

Digital circuit 200 has a signal-pre-processing module 210 configured to receive digital signals $168_1$-$168_4$. One function of module 210 may be to adapt the signal samples received via digital signals $168_1$-$168_4$ to a form suitable for the signal-processing algorithms implemented in the downstream modules of digital circuit 200. For example, module 210 may be configured to convert the signal samples received via digital signals $168_1$-$168_4$ into the corresponding complex-valued signal samples for digital signals 212a and 212b.

In one embodiment, module 210 may also be configured to reduce signal distortions imposed by front-end circuit 172 (see FIG. 1). Said distortions may be caused, e.g., by incorrect biasing of various electro-optical components in O/E converter 160, imperfect signal splitting in power and polarization splitters and optical couplers, frequency dependence and variability of the O/E conversion characteristics of the photodetectors, etc. Representative signal-processing methods that can be implemented in module 210 for this purpose are disclosed, e.g., in U.S. Patent Application Publication No. 2012/0057863, which is incorporated herein by reference in its entirety.

Complex-valued digital signals 212a and 212b are applied to chromatic-dispersion-compensation (CDC) modules 220a and 220b, respectively, for CDC processing therein, and the resulting CDC-processed signals are complex-valued digital signals 222a and 222b. A CDC controller 230 serves to generate a control signal 232 that appropriately configures various configurable elements within CDC modules 220a and 220b to significantly reduce or substantially cancel the detrimental effects of chromatic dispersion caused by optical transport link 140. CDC controller 230 generates control signal 232 by estimating the group delay in optical transport link 140 based on digital signals 212a and 212b and, optionally, a feedback signal (not explicitly shown in FIG. 2) received from one or more downstream modules of digital circuit 200. Example circuit structures that can be used in CDC modules 220a and 220b and example signal-processing methods that can be adapted for generating control signal 232 are disclosed, e.g., in U.S. Pat. Nos. 8,260,154, 7,636,525, 7,266,310, all of which are incorporated herein by reference in their entirety.

Digital signals 222a and 222b generated by CDC modules 220a and 220b are applied to a 2×2 MIMO (multiple-input/multiple-output) equalizer 240, for MIMO-equalization processing therein, and to a clock-recovery circuit 234 for properly controlling the sampling times of ADCs $166_1$-$166_4$ (FIG. 1).

In an example embodiment, clock-recovery circuit 234 is configured to use a clock recovery algorithm that can work with both PDM-QPSK and PDM-QDB signals. One such clock recovery algorithm is disclosed, e.g., in U.S. Patent Application Publication No. 2014/0105616, which is incorporated herein by reference in its entirety. Useful modifications to the latter algorithm that may be used in some embodiments of clock-recovery circuit 234 are disclosed in the article by Meng Yan, Zhenning Tao, Liang Dou, et al., entitled "Digital Clock Recovery Algorithm for Nyquist Signal," published in 2013 OFC/NFOEC Technical Digest as paper OTu2I.7, which article is incorporated herein by reference in its entirety. Note that some clock recovery algorithms, such as the conventional Gardner's algorithm, may not work well for both PDM-QPSK and PDM-QDB signals due to the relatively narrow bandwidth of QDB signals. Therefore, appropriate care should be taken while selecting the operative clock recovery algorithm for use in clock-recovery circuit 234.

FIG. 3 graphically shows the relationship between QPSK and QDB constellations, which may be useful for understanding a principle of operation of digital circuit 200 (FIG. 2) according to an embodiment of the disclosure. More specifically, the left panel in FIG. 3 shows a QPSK constellation 310. The right panel in FIG. 3 shows a QDB constellation 320. The middle panel in FIG. 3 shows transfer functions $f_1(z)$ and $f_2(z)$ that can be used to interconvert constellations 310 and 320.

QPSK constellation 310 has four constellation points located in four different quadrants of the IQ plane as indicated in FIG. 3. All of the four constellation points are located on the same radius and have the same distance from the origin of the IQ plane. The phase increment between any two constellation points located in the adjacent quadrants is 90 degrees.

QDB constellation 320 has nine constellation points located on a rectangular grid. Four of the nine constellation points are located on a first radius. Another four of the nine constellation points are located on a smaller second radius. One of the nine constellation points is located at the origin of the IQ plane.

An application of transfer function $f_1(z)=1+z^{-1}$ to QPSK constellation 310 transforms it into QDB constellation 320. In the discrete-time domain, transfer function $f_1(z)$ can be implemented using the symbol transformation given by Eq. (1):

$$D_n = B_n + B_{n-1} \quad (1)$$

where $B_n$ is a constellation symbol of QPSK constellation 310 in the n-th symbol period; $B_{n-1}$ is a constellation symbol of QPSK constellation 310 in the (n−1)-th symbol period; and $D_n$ is the resulting constellation symbol of QDB constellation 320 in the n-th symbol period.

An application of transfer function $f_2(z)=1/(1+z^{-1})$ to QDB constellation 320 transforms it into QPSK constellation 310. Unlike transfer function $f_1(z)$, transfer function $f_2(z)$ can only be approximated in the discrete-time domain because it does not reduce to a finite polynomial expansion in $z^{-1}$. In general, the accuracy of the approximation increases with an increase in the number of $z^{-1}$ delay taps in the corresponding finite-impulse-response (FIR) filter.

As indicated in FIG. 2, the configuration of equalizer 240 is controlled by a constant modulus algorithm (CMA) configured to track and minimize estimated errors in the data-recovery process as known in the art. In an example embodiment, equalizer 240 can be configured to perform the following equalization operations: (i) electronic polarization de-multiplexing and (ii) signal processing directed at reducing the adverse effects of certain signal impairments, such as polarization-mode dispersion, polarization-dependent loss, inter-symbol interference, and residual chromatic dispersion. A control signal 238 generated by a CMA-based controller (not explicitly shown in FIG. 2) will generally cause these equalization operations to be performed in a similar manner regardless of whether optical signal 130' (FIG. 1) is a PDM-QPSK signal or a PDM-QDB signal. For the purposes of further analyses, we denote the transfer function corresponding to these equalization operations as E(z). One of ordinary skill in the art will recognize that transfer function E(z) can be expressed as a 2×2 matrix.

When optical signal 130' is a PDM-QPSK signal, control signal 238 generated by the CMA-based controller causes the overall transfer function applied by equalizer 240 to digital signals 222a and 222b to be approximately E(z). However, when optical signal 130' is a PDM-QDB signal, control signal 238 generated by the same CMA-based controller based on the same constant modulus algorithm causes the overall transfer function applied by equalizer 240 to digital signals 222a and 222b to be approximately expressed by Eq. (2):

$$F(z) \approx E(z)f_2(z) \quad (2)$$

where F(z) denotes the transfer function of equalizer 240. The different form of the transfer function in the latter case is caused by the fact that QDB constellation 320 has constellation points located on three different radii, i.e., the above-mentioned first, second, and zero radii (see FIG. 3). An appropriately configured constant modulus algorithm will tend to configure equalizer 240 to apply, inter alia, a transform that causes the equalized signal samples in digital signals 242a and 242b to be clustered near a single constant radius, thereby causing the overall transfer function to be approximated by Eq. (2). In contrast, QPSK constellation 310 already has constellation points located on a single radius. As a result, the same constant modulus algorithm will tend to configure equalizer 240 to apply the overall transfer function E(z), which is sufficient for causing the equalized signal samples in digital signals 242a and 242b to be clustered near that single constant radius.

Digital signals 242a and 242b generated by MIMO equalizer 240 are applied to carrier-recovery modules 250a and 250b, respectively. The signal processing implemented in carrier-recovery modules 250a and 250b is generally directed at compensating the frequency mismatch between the carrier frequencies of OLO signal 158 and optical input signal 130' and reducing the effects of phase noise. Various signal-processing techniques that can be used to implement the frequency-mismatch compensation are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction are disclosed, e.g., in the above-cited U.S. Patent Application Publication No. 2013/0230312.

Digital signals 252a and 252b generated by carrier-recovery modules 250a and 250b, respectively, are applied to a constellation converter 260. In an example embodiment, constellation converter 260 is configured to apply transfer function $f_1(z)=1+z^{-1}$ to each of digital signals 252a and 252b, thereby converting them into digital signals 262a and 262b, respectively.

Figure 4C:
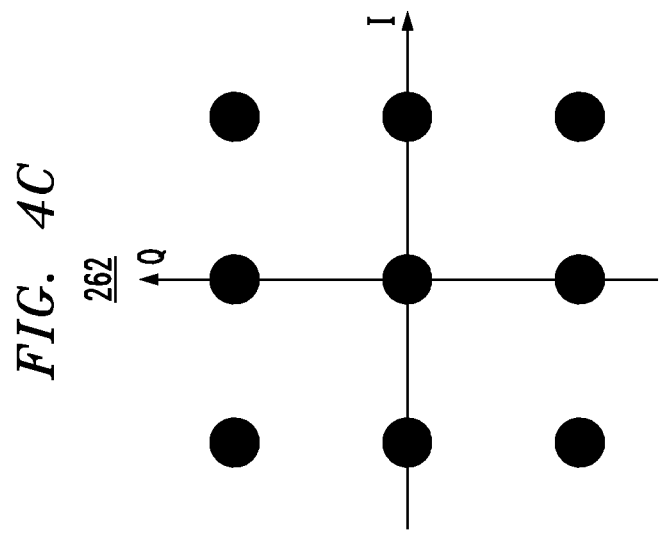
FIGS. 4A-4C graphically depict approximate scatter plots corresponding to certain digital signals generated in the digital circuit of FIG. 2 according to an embodiment of the disclosure.
Figure 4B:
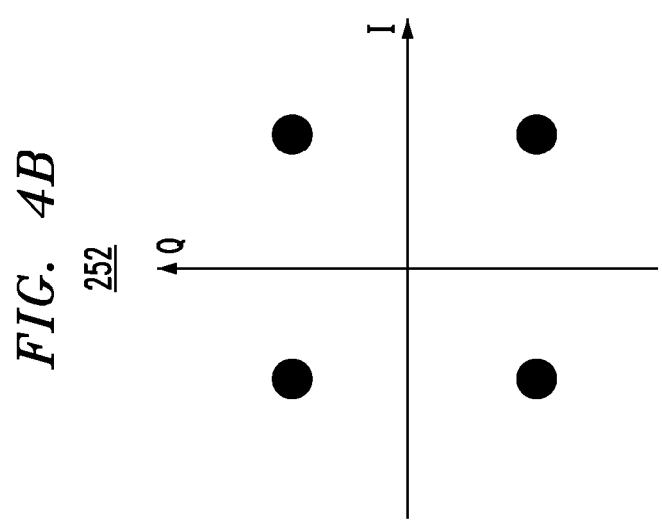
Figure 4A:
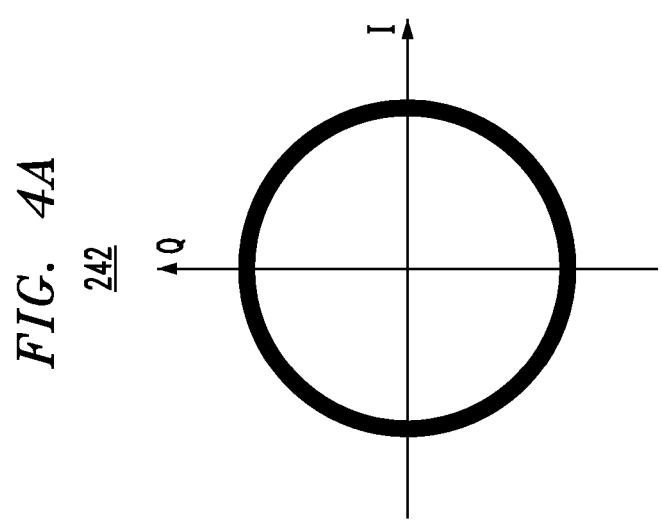

FIGS. 4A-4C graphically depict approximate scatter plots corresponding to digital signals 242, 252, and 262, respectively, according to an embodiment of the disclosure.

As already indicated above, the signal processing implemented in equalizer 240 causes the equalized signal samples in each of digital signals 242a and 242b to be clustered near a single radius in the IQ plane. The (yet uncompensated) frequency mismatch between the carrier frequencies of OLO signal 158 and optical input signal 130' causes the constellation to rotate about the origin of the IQ plane, thereby causing the equalized signal samples in each of digital signals 242a and 242b to form an approximately circular band, e.g., similar to that shown in FIG. 4A.

The signal processing implemented in carrier-recovery modules 250a and 250b stops the constellation rotation, which causes the signal samples in each of digital signals 252a and 252b to form on the IQ plane four distinct signal-sample clusters, e.g., similar to those shown in FIG. 4B. Due to the above-explained sensitivity of the transfer function of equalizer 240 to the modulation format of optical input signal 130', qualitatively similar scatter plots are produced by digital signals 252a and 252b regardless of whether the optical input signal is a PDM-QPSK signal or a PDM-QDB signal.

The application of transfer function $f_1(z)=1+z^{-1}$ in constellation converter 260 causes the signal samples in each of digital signals 262a and 262b to form on the IQ plane nine distinct signal-sample clusters, e.g., similar to those shown in FIG. 4C. The transformation of the scatter plot depicted in FIG. 4B into the scatter plot depicted in FIG. 4C is qualitatively similar to the transformation of QPSK constellation 310 into QDB constellation 320 described above in reference to FIG. 3.

Referring back to FIG. 2, digital signals 262a and 262b generated by constellation converter 260 are applied to a QDB decoder 270. Decoder 270 is configured to use the complex values conveyed by digital signals 262a and 262b to appropriately map each received symbol onto QDB constellation 320. Based on said mapping, and by then applying decoding operations that are inverse of the corresponding encoding operations applied by encoder 112 in transmitter 110 (FIG. 1), decoder 270 recovers the original payload data 102. One of ordinary skill in the art will recognize that, due to the differential coding applied in transmitter 110 and due to the unambiguous relationship between the QPSK and QDB constellations (e.g., as described in reference to FIG. 3), decoder 270 is able to correctly recover the original payload data 102 regardless of the modulation format used at the transmitter.

In different embodiments, decoder 270 may be configured to use symbol-by-symbol detection or maximum-likelihood-sequence-estimation (MLSE) detection. The symbol-by-symbol detection may work well when both pre-coding and differential coding are applied to payload data 102 by encoder 112 (FIG. 1). MLSE detection may be beneficial in preventing error propagation when encoder 112 is not configured to apply pre-coding and only applies differential coding to payload data 102.

Figure 5:
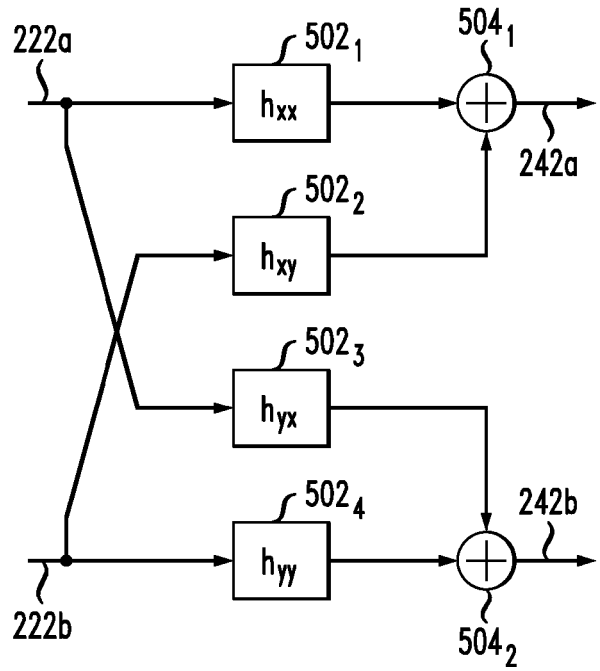
FIG. 5 shows a block diagram of a butterfly equalizer that can be in the digital circuit of FIG. 2 according to an embodiment of the disclosure.

FIG. 5 shows a block diagram of a butterfly equalizer 500 that can be used as equalizer 240 (FIG. 2) according to an embodiment of the disclosure. Equalizer 500 is configured to receive digital signals 222a and 222b and process them as described below to generate digital signals 242a and 242b. More specifically, equalizer 500 is configured to mix digital signals 222a and 222b, as indicated in FIG. 5, using equalization filters $502_1$-$502_4$ and adders $504_1$ and $504_2$.

The signal transformation performed by equalizer 500 can be mathematically described by Eqs. (3a)-(3b):

$$X'=h_{xx}*X+h_{xy}*Y \quad (3a)$$

$$Y'=h_{yx}*X+h_{yy}*Y \quad (3b)$$

where X' is signal 242a; Y' is signal 242b; X is signal 222a; Y is signal 222b; the "*" symbol denotes the convolution operation; and $h_{xx}$, $h_{yy}$, $h_{yx}$, and $h_{xy}$ are the transfer functions of equalization filters $502_1$-$502_4$, respectively. In operation, the individual transfer functions of equalization filters $502_1$-$502_4$ may be controlled by the corresponding CMA-based controller, e.g., via control signal 238 (not explicitly shown in FIG. 5; see FIG. 2). In an example embodiment, each of equalization filters $502_1$-$502_4$ may be implemented as a FIR filter. Both time-domain and frequency-domain implementations of equalization filters $502_1$-$502_4$ are possible. Some embodiments of equalizer 500 may benefit from the use of digital circuits and/or signal-processing methods disclosed in U.S. Patent Application Publication No. 2014/0086594, which is incorporated herein by reference in its entirety.

Figure 6:
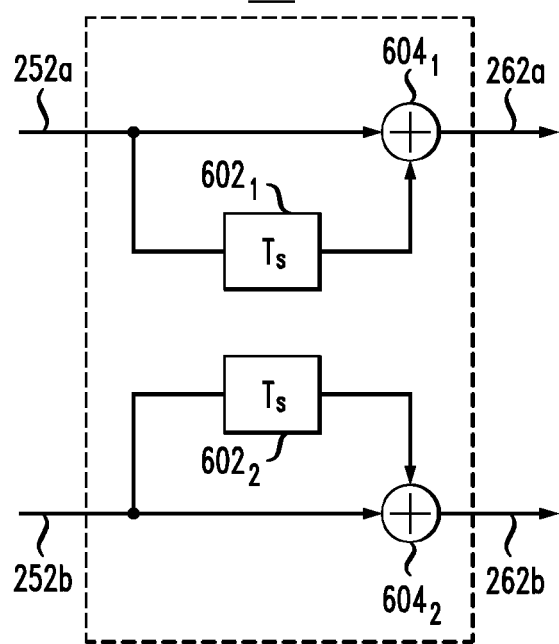
FIG. 6 shows a block diagram of an electrical digital circuit that can be used in the digital circuit of FIG. 2 according to an embodiment of the disclosure.

FIG. 6 shows a block diagram of a digital circuit 600 that can be used as constellation converter 260 (FIG. 2) according to an embodiment of the disclosure. Circuit 600 is configured to receive digital signals 252a and 252b and process them as described below to generate digital signals 262a and 262b. Circuit 600 comprises delay elements $602_1$ and $602_2$ and adders $604_1$ and $604_2$. Each of delay elements $602_1$ and $602_2$ is configured to introduce a time delay of $T_s$, where $T_s$ is the duration of a symbol period. Each of adders $604_1$ and $604_2$ is configured to implement Eq. (1). One of ordinary skill in the art will recognize that circuit 600 operates to apply transfer function $f_1(z)=1+z^{-1}$ to each of digital signals 252*a* and 252*b*, thereby performing the above-described QPSK to QDB constellation conversion.

According to an example embodiment disclosed above in reference to FIGS. 1-6, provided is an apparatus (e.g., 100, FIG. 1) comprising: a front-end circuit (e.g., 172, FIG. 1) configured to mix an optical input signal (e.g., 130', FIG. 1) and an optical reference signal (e.g., 158, FIG. 1) to generate a first plurality of electrical digital measures (e.g., $168_1$-$168_4$, FIG. 1) of the optical input signal; and a digital processor (e.g., 170, FIG. 1; 200, FIG. 2) configured to: (i) process the first plurality of electrical digital measures to recover data (e.g., 102, FIG. 1) encoded in the optical input signal; and (ii) use inter-conversion between a QPSK constellation (e.g., 310, FIG. 3) and a QDB constellation (e.g., 320, FIG. 3) to enable recovery of the data both when the optical input signal is QPSK-modulated and when the optical input signal is QDB-modulated.

In some embodiments of the above apparatus, the digital processor comprises: an equalizer (e.g., 240, FIG. 2) configured to apply a first transfer function (e.g., F(z)) to a second plurality of electrical digital measures (e.g., 222*a*-222*b*, FIG. 2) of the optical input signal derived by the digital processor from the first plurality of electrical digital measures; a constellation converter (e.g., 260, FIG. 2) configured to generate a third plurality of electrical digital measures (e.g., 262*a*-262*b*, FIG. 2) of the optical input signal by applying a second transfer function (e.g., $f_1(z)=1+z^{-1}$) to a fourth plurality of electrical digital measures (e.g., 252*a*-252*b*, FIG. 2) of the optical input signal derived by the digital processor from the second plurality of electrical digital measures, said second transfer function configured to convert the QPSK constellation into the QDB constellation; and a decoder (e.g., 270, FIG. 2) configured to recover the data by mapping the third plurality of electrical digital measures onto the QDB constellation.

In some embodiments of any of the above apparatus, when the optical input signal is QDB-modulated, the first transfer function (e.g., expressed by Eq. (2)) is configured to convert the QDB constellation into the QPSK constellation.

In some embodiments of any of the above apparatus, the first transfer function is further configured to cause the equalizer to perform electronic polarization demultiplexing regardless of whether the optical input signal is QPSK-modulated or QDB-modulated.

In some embodiments of any of the above apparatus, the equalizer is a 2×2 MIMO equalizer (e.g., 240, FIG. 2).

In some embodiments of any of the above apparatus, the equalizer is a butterfly equalizer (e.g., 500, FIG. 5).

In some embodiments of any of the above apparatus, the equalizer comprises four finite impulse response filters (e.g., $502_1$-$502_4$, FIG. 5).

In some embodiments of any of the above apparatus, the digital processor further comprises an electronic controller configured to cause the equalizer (e.g., via control signal 238, FIG. 2) to apply the first transfer function based on a constant modulus algorithm.

In some embodiments of any of the above apparatus, the constellation converter comprises: a first delay element (e.g., $602_1$, FIG. 6) configured to generate a first delayed digital signal by delaying a first electrical digital measure (e.g., 252*a*, FIG. 6) of the fourth plurality by a symbol period of the optical input signal; and a first adder (e.g., $604_1$, FIG. 6) configured to generate a first electrical digital measure (e.g., 262*a*, FIG. 6) of the fourth plurality by summing the first electrical digital measure and the first delayed digital signal.

In some embodiments of any of the above apparatus, the constellation converter further comprises: a second delay element (e.g., $602_2$, FIG. 6) configured to generate a second delayed digital signal by delaying a second electrical digital measure (e.g., 252*b*, FIG. 6) of the fourth plurality by a symbol period of the optical input signal; and a second adder (e.g., $604_2$, FIG. 6) configured to generate a second electrical digital measure (e.g., 262*b*, FIG. 6) of the fourth plurality by summing the second electrical digital measure and the second delayed digital signal.

In some embodiments of any of the above apparatus, the digital processor further comprises a clock-recovery circuit (e.g., 234, FIG. 2) coupled to receive a copy of the second plurality of electrical digital measures and configured to control sampling times used by the front-end circuit in a process of generating the first plurality of electrical digital measures. In some embodiments of any of the above apparatus, the clock-recovery circuit is configured to use a clock-recovery algorithm that enables control of the sampling times both when the optical input signal is QPSK-modulated and when the optical input signal is QDB-modulated.

In some embodiments of any of the above apparatus, the apparatus further comprises an optical transmitter (e.g., 110, FIG. 1) configured to cause the front-end circuit to receive the optical input signal.

In some embodiments of any of the above apparatus, the optical transmitter is configured to cause the optical input signal to be QPSK-modulated.

In some embodiments of any of the above apparatus, the optical transmitter is configured to cause the optical input signal to be QDB-modulated.

In some embodiments of any of the above apparatus, the optical transmitter is configured to cause the optical input signal to be polarization-division-multiplexed.

In some embodiments of any of the above apparatus, the optical transmitter is configured to cause the optical input signal to be differentially encoded using the QDB constellation or the QPSK constellation.

According to another example embodiment disclosed above in reference to FIGS. 1-6, provided is an optical communications method comprising the steps of: (A) optically mixing an optical input signal (e.g., 130', FIG. 1) and an optical reference signal (e.g., 158, FIG. 1) to generate a first plurality of electrical digital measures (e.g., $168_1$-$168_4$, FIG. 1) of the optical input signal; (B) processing the first plurality of electrical digital measures to recover data (e.g., 102, FIG. 1) encoded in the optical input signal; and (C) using inter-conversion between a QPSK constellation (e.g., 310, FIG. 3) and a QDB constellation (e.g., 320, FIG. 3) to enable recovery of the data both when the optical input signal is QPSK-modulated and when the optical input signal is QDB-modulated.

In some embodiments of the above method, the method further comprises the steps of: (D) applying a first transfer function (e.g., F(z)) to a second plurality of electrical digital measures (e.g., 222*a*-222*b*, FIG. 2) of the optical input signal derived from the first plurality of electrical digital measures; (E) generating a third plurality of electrical digital measures (e.g., 262*a*-262*b*, FIG. 2) of the optical input signal by applying a second transfer function (e.g., $f_1(z)=1+z^{-1}$) to a fourth plurality of electrical digital measures (e.g., 252*a*-252*b*, FIG. 2) of the optical input signal derived from the second plurality of electrical digital measures, said second transfer function configured to convert the QPSK constellation into the QDB constellation; and (F) recovering the data by mapping the third plurality of electrical digital measures onto the QDB constellation.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

What is claimed is:

1. An apparatus comprising:
    a front-end circuit configured to mix an optical input signal and an optical reference signal to generate a first plurality of electrical digital measures of the optical input signal; and
    a digital processor configured to process the first plurality of electrical digital measures in a manner that enables the digital processor to recover data encoded in the optical input signal both for a case that the optical input signal is QPSK-modulated and for a case that the optical input signal is QDB-modulated;
    wherein the digital processor comprises an equalizer configured to perform equalization processing in a manner that causes equalized signal samples generated by the equalizer to be located substantially on a single constant radius on a complex plane regardless of whether the optical input signal is QPSK-modulated or QDB-modulated; and
    wherein the digital processor is configured to recover the data using the equalized signal samples.

2. The apparatus of claim 1, wherein the equalizer is configured to apply a first transfer function to a second plurality of electrical digital measures of the optical input signal derived by the digital processor from the first plurality of electrical digital measures to generate the equalized signal samples.

3. The apparatus of claim 2, wherein:
    for the case that the optical input signal is QDB-modulated, the equalizer is configured by the first transfer function to convert a QDB constellation into a QPSK constellation.

4. The apparatus of claim 3, wherein the equalizer is further configured by the first transfer function to perform electronic polarization demultiplexing regardless of whether the optical input signal is QPSK-modulated or QDB-modulated.

5. The apparatus of claim 2, wherein the equalizer is further configured by the first transfer function to perform electronic polarization demultiplexing regardless of whether the optical input signal is QPSK-modulated or QDB-modulated.

6. The apparatus of claim 2, wherein the equalizer is a 2×2 MIMO equalizer.

7. The apparatus of claim 2, wherein the equalizer comprises a butterfly equalizer.

8. The apparatus of claim 2, wherein the equalizer comprises four finite impulse response filters.

9. The apparatus of claim 2, wherein the digital processor further comprises an electronic controller configured to cause the equalizer to apply the first transfer function based on a constant modulus algorithm.

10. The apparatus of claim 2,
    wherein the digital processor further comprises a clock-recovery circuit coupled to receive a copy of the second plurality of electrical digital measures and configured to control sampling times used by the front-end circuit in a process of generating the first plurality of electrical digital measures; and wherein the clock-recovery circuit is configured to use a clock-recovery algorithm that enables control of the sampling times both for the case that the optical input signal is QPSK-modulated and for the case that the optical input signal is QDB-modulated.

11. The apparatus of claim 1, further comprising an optical transmitter configured to cause the front-end circuit to receive the optical input signal.

12. The apparatus of claim 11, wherein the optical transmitter is configured to cause the optical input signal to be QPSK-modulated.

13. The apparatus of claim 11, wherein the optical transmitter is configured to cause the optical input signal to be QDB-modulated.

14. The apparatus of claim 11, wherein the optical transmitter is configured to cause the optical input signal to be polarization-division-multiplexed.

15. The apparatus of claim 11, wherein the optical transmitter is configured to cause the optical input signal to be differentially encoded using a QDB constellation or a QPSK constellation.

16. The apparatus of claim 3, wherein the digital processor further comprises:
   a constellation converter configured to generate a third plurality of electrical digital measures of the optical input signal by applying a second transfer function to a fourth plurality of electrical digital measures of the optical input signal derived by the digital processor from the equalized signal samples, said constellation converter configured by said second transfer function to convert the QPSK constellation into the QDB constellation; and
   a decoder configured to recover the data by mapping the third plurality of electrical digital measures onto the QDB constellation.

17. The apparatus of claim 16, wherein the constellation converter comprises:
   a first delay element configured to generate a first delayed digital signal by delaying a first electrical digital measure of the fourth plurality by a symbol period of the optical input signal; and
   a first adder configured to generate a first electrical digital measure of the third plurality by summing the first electrical digital measure and the first delayed digital signal.

18. The apparatus of claim 17, wherein the constellation converter further comprises:
   a second delay element configured to generate a second delayed digital signal by delaying a second electrical digital measure of the fourth plurality by a symbol period of the optical input signal; and
   a second adder configured to generate a second electrical digital of the third plurality by summing the second electrical digital measure and the second delayed digital signal.

19. An optical communications method, comprising:
   configuring a front-end circuit to optically mix an optical input signal and an optical reference signal to generate a first plurality of electrical digital measures of the optical input signal;
   configuring a digital processor to process the first plurality of electrical digital measures to recover data encoded in the optical input signal in a manner that enables the digital processor to recover the data both for a case that the optical input signal is QPSK-modulated and for a case that the optical input signal is QDB-modulated, wherein said configuring the digital processor includes configuring the digital processor to perform equalization processing that causes equalized signal samples generated using said equalization processing to be located substantially on a single constant radius on a complex plane regardless of whether the optical input signal is QPSK-modulated or QDB-modulated; and
   configuring the digital processor to recover the data using the equalized signal samples.

* * * * *